United States Patent [19]

Mori

[11] 4,114,573
[45] Sep. 19, 1978

[54] ELECTRONIC IGNITION TIMING CONTROL DEVICE FOR INTERNAL COMBUSTION ENGINES

[75] Inventor: Yasunori Mori, Katsuta, Japan

[73] Assignee: Hitachi, Ltd., Japan

[21] Appl. No.: 763,695

[22] Filed: Jan. 28, 1977

[30] Foreign Application Priority Data

Jan. 28, 1976 [JP] Japan ................................ 51-7505

[51] Int. Cl.$^2$ ............................................. F02P 5/04
[52] U.S. Cl. ............................ 123/117 D; 235/92 CP
[58] Field of Search ........... 123/117 D, 117 R, 148 E; 235/92 CP, 92 CC, 92 T, 92 TF, 92 TC, 150.21

[56] References Cited

U.S. PATENT DOCUMENTS

| | | | |
|---|---|---|---|
| 3,541,311 | 11/1970 | Taylor | 235/92 TF |
| 3,846,625 | 11/1974 | Sasayama | 235/150.21 |
| 3,870,869 | 3/1975 | Eberle et al. | 235/92 CC |
| 3,908,616 | 9/1975 | Sasayama | 123/117 D |
| 3,923,022 | 12/1975 | Scholl | 123/117 D |
| 3,953,716 | 4/1976 | Monpelit | 235/92 CC |
| 4,009,372 | 2/1977 | Przybylski | 235/92 CC |
| 4,032,755 | 6/1977 | Bard et al. | 235/92 CC |

*Primary Examiner*—Charles J. Myhre
*Assistant Examiner*—R. D. Nelli
*Attorney, Agent, or Firm*—Craig & Antonelli

[57] ABSTRACT

An up-counter counts pulses of a first pulse train of a variable frequency during each pulse-duration of pulses generated corresponding to the angular position of a crankshaft of an engine. The so counted value is transferred to a down-counter which counts pulses of a second pulse train with a constant frequency so as to diminish its transferred content. The down-counter produces an output signal as an ignition timing signal when its content decreases down to a predetermined value. In the ignition timing control device of such type, the first pulse train of the variable frequency can be provided by a novel advance angle establishing means in which a given short time period is divided into two time portions and from which two pulse trains of different frequency from each other are outputted for the respective time portions, the ratio of sharing being controlled in accordance with the number of revolutions of the engine and the opening value of the throttle.

9 Claims, 5 Drawing Figures

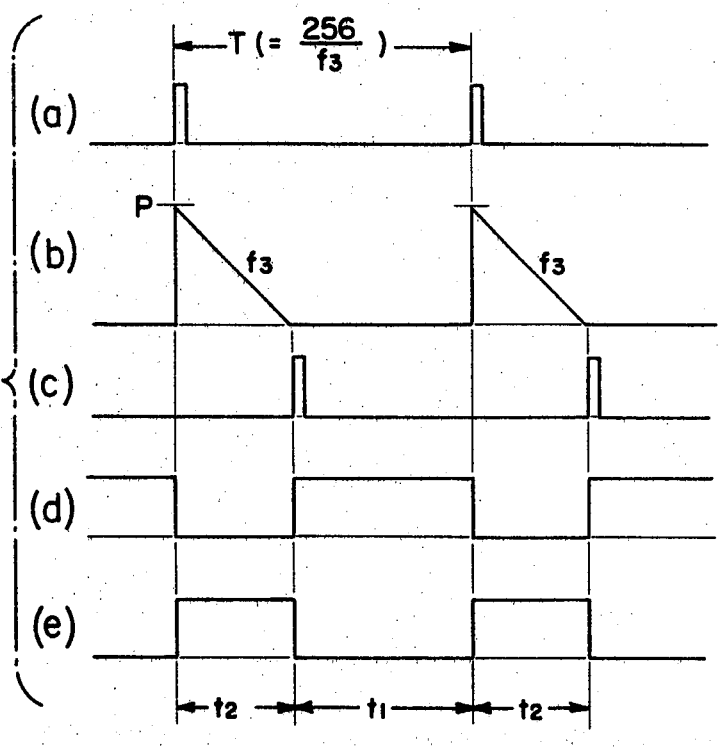
FIG. 2.
FIG. 3(a).
FIG. 3(b).
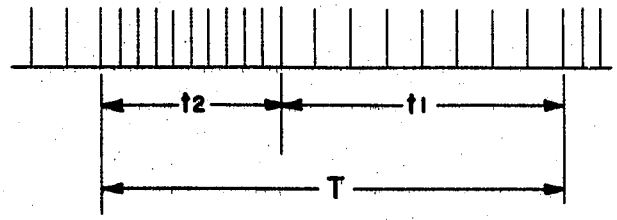

1

ELECTRONIC IGNITION TIMING CONTROL DEVICE FOR INTERNAL COMBUSTION ENGINES

BACKGROUND OF THE INVENTION

The present invention relates generally to an electronic ignition device for use in internal combustion engines, and more particularly to the improvement of a digital ignition timing control device of the type described in U.S. Pat. No. 3,908,616, issued to Takao Sasayama on Sept. 30, 1975, and assigned to the assignee of the present application.

In the prior device, there is provided an ignition timing control device in which a first pulse train of a first frequency is counted by a first counter during each period between signals generated corresponding to predetermined angular positions of a crankshaft of the engine and the value so counted during each one of said periods is transferred to a second counter in which the transferred value is decreased by pulses of a second pulse train of a second frequency. The second counter produces an ignition timing signal upon reduction of said transferred value down to a predetermined value. The pulse frequency of the first pulse train is changed in accordance with the desired operating condition of the engine. Changing of the frequency, in the embodiment of the above-referred U.S. Patent, was achieved by utilizing a divide-by-N counter, that is to say, a well-known N stage counter, and desired pulse trains were derived from corresponding stages thereof. The frequency of the thus obtained pulse trains is, therefore, inverse to the $k$-th power of two ($k$ being a positive integer less than N), i.e., 1, $\frac{1}{2}$, $\frac{1}{4}$, ... 1/$k$. Only from such pulse trains could the above-mentioned first pulse train be selected, so that the frequency which could be selected was very limited and a fine selection of the frequency was impossible.

On the other hand, a finer and more accurate control of the ignition timing is being required in connection with various problems, e.g., saving fuel, environmental pollution, etc.

SUMMARY OF THE INVENTION

Accordingly, it is an object of the present invention to provide an improved digital ignition control device for an internal combustion engine in which a fine and accurate control of the ignition timing can be achieved.

More specifically, it is a characteristic feature of the present invention to provide a digital ignition timing control device of a type above mentioned having two counters, in which the frequency of the first counter is controllable finely in accordance with the operation condition of the engine.

The object of this invention can be achieved by means of an advance angle establishing unit provided according to the present invention, which has time sharing means for dividing each one of the time periods repeated with a given constant frequency into two time portions, in each of which a pulse train of a different frequency from that of the other time portion is generated in order to produce said first pulse train of the first frequency, the ratio of sharing being controlled in accordance with the operating condition required of the engine.

BRIEF DESCRIPTION OF THE DRAWINGS

FIGS. 2(a) to 2(e) are signal time charts useful for the explanation of the operation of an advance angle establishing unit employed in the device of FIG. 1;

FIGS. 3(a) and 3(b) show an example of an output pulse train of the above mentioned advance angle establishing unit.

DETAILED DESCRIPTION OF THE PREFERRED EMBODIMENT

Figure 1:
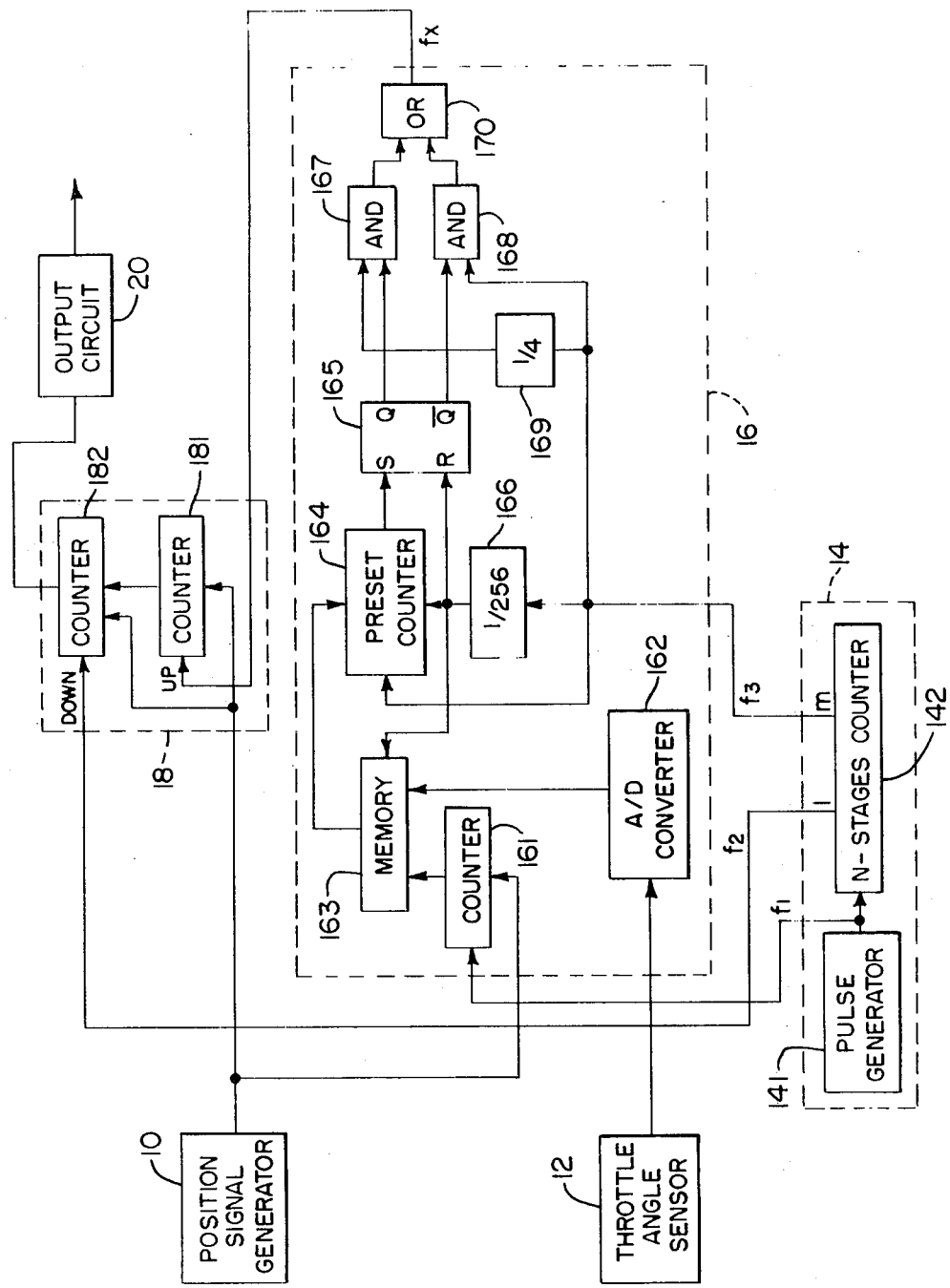
FIG. 1 is a schematic block diagram of an ignition control device according to a preferred embodiment of the present invention.

Referring first to the drawing, there is shown in FIG. 1 a digital ignition timing control device according to an embodiment of the present invention. In this figure, a position signal generator 10 is composed of a magnetic pick-up and a waveform shaping circuit which arranges the output of the magnetic pick-up in a pulse form. Usually, the position signal generator 10 is installed within a housing of a known distributor (not shown) and detects an angular position of a rotor of the distributor to produce a position signal. As is well-known, the angular position corresponds and is proportional to the angular position of a crankshaft of the engine. Namely, the ratio of the number of revolutions between the rotor and the crankshaft is so selected, in the case of a 4-cycle engine, that, when the crankshaft rotates twice, the distributor rotor rotates once. Accordingly, it can be said that the position signal generator 10 detects the position of the crankshaft by sensing the angular position of the distributor rotor and therefore the position signal output therefrom represents the position of the crankshaft. The position signal generator 10, therefore, also can be actuated directly by the crankshaft. In any case, the position signal generator 10 must produce 4 pulses every rotation of the distributor rotor, i.e., every two rotations of the crankshaft, in the case of the 4-cycle, 4 cylinder engine.

A throttle angle sensor 12 detects the opening degree of the engine throttle and outputs an analog signal proportional thereto. For the sensor 12 a known device can be used.

A pulse source unit 14 comprises a pulse generator 141 and a N-stage counter 142 which is constructed of N binary circuits connected with one another in cascade. The pulse source 14 provides pulse trains of various frequencies, e.g., $f_1$, $f_2$ and $f_3$ (in this case $f_1 > f_2 > f_3$). In the description hereafter, the references $f_1$, $f_2$ and $f_3$ will be also used for the purpose of identification of the pulse trains themselves having the corresponding frequency. In the case shown, an output pulse train of the pulse generator 141 is used as one of the output pulse trains of the pulse source unit 14, i.e., as the pulse train $f_1$. Simultaneously, the output pulse train $f_1$ is also applied to the N-stage counter 142, which counts the pulses thereof.

As is well-known, the counter constructed as above mentioned can divide the frequency of an input pulse train and each state, e.g., the $k$-th binary circuit provides the output pulse train with the frequency of $\frac{1}{2^k}$ of the input frequency. In the embodiment shown, further output pulse trains of the pulse source unit 14 are derived from the l-th and m-th stages of the counter 142 ($l < m < N$), and therefore the pulse trains with the frequencies of $f_1/2^l$ and $f_1/2^m$ are used as the pulse trains $f_2$ and $f_3$, respectively.

An advance angle establishing unit 16, which receives the signals from the position signal generator 10 and the throttle angle sensor 12 to produce the advance angle signal, is formed as follows. A counter 161 counts the pulses of signal $f_1$ for each duration between a certain pulse and the succeeding one thereto from the generator 10, produces an output corresponding to the counted value and clears its content at the end of every counting duration. The output thereof is a binary-coded signal; in this case, having 8 bits. On the other hand, the analog signal proportional to the opening of the throttle is also converted into a digital signal by an analog/digital converter 162. In this case, the converted digital signal also has 8 bits. The two digital output signals are applied to a memory 163, in which they are used as address designating signals. The memory 163 can be composed of a so-called read-only memory. The data which determines the advance angle of the ignition according to the number of revolutions of the engine and the opening of the throttle are stored in predetermined storage locations designated by the respective addresses of the memory 163 in the binary-coded form of 16 bits. Thus, the information necessary for a certain operational condition of the engine can be obtained from the memory by designating the address in which it is stored. Since it is obvious to one having the ordinary skill in the art to determine the relationship among the rotational speed of the engine, the throttle opening and the ignition angle to be advanced according thereto and to code the determined relationship into a binary form to store it in the memory, the detailed explanation thereof is omitted here.

A stored content in the memory designated by the above-mentioned address signals is read out and transferred to a preset counter 164, which then has, in this case, the same 16 bits as the memory 163. The counter 164 performs a subscription in response to receipt of the pulse train $f_3$. Namely, the preset counter 164 decreases its preset content for every received pulse of the pulse train $f_3$. When the remaining content becomes zero as a result of the subtraction, the preset counter 164 provides an output which is applied to a set-terminal S of a set-reset type flip-flop circuit 165. Further, the preset counter 164 is cleared by a pulse from a frequency divider 166 which divides the frequency $f_3$ into 1/256. The dividing ratio here can be selected arbitrarily. Pulses which repeat with a given constant frequency are sufficient for this purpose. The divided pulse is also applied to the memory 163 and a reset terminal R of the flip-flop circuit 165. The pulse signal applied to the memory 163 serves as a signal for reading out the stored content in the designated address to transfer it into the preset counter 164. The preset counter 164 is preset with the content read out from the memory 163, just after it is cleared by the signal from the divider 166.

Two output terminals Q and $\overline{Q}$ of the flip-flop circuit 165 are connected to one respective terminal of two AND gates 167 and 168, the other terminals of which are supplied with pulse trains of different frequency. In the embodiment shown these pulse trains are provided as follows. One of the pulse trains is provided directly from the m-th stage of the N-stage counter 142, so that it has the frequency of $f_3$. The other pulse train is obtained by dividing the pulse train $f_3$ into ¼ by a frequency divider 169. This dividing ratio can be other than ¼. It is, however, advantageously selected so as to be in inverse proportion to the power of 2, because such a frequency dividing circuit can be easily constructed by means of a given number of known binary circuits. Further, the provision of the above two pulse trains is not limited to use of a particular frequency divider as above mentioned.

The later of these pulse trains is applied to the other terminal of the AND gate 167 and the former pulse train to the other terminal of the AND gate 168. The outputs of both AND gates 167 and 168 are applied to an OR gate 170, the output of which is given to an ignition timing unit 18.

The ignition timing unit 18 has two counters 181 and 182. The counter 181 starts counting pulses of a pulse train $f_x$ from the advance angle establishing unit 16 upon receipt of the output signal of the position signal generator 10. When the next output signal of the generator 10 comes to the counter 181, it transfers the counted value to the counter 182 and is cleared thereafter. The cleared counter 181 begins to count the pulses of the pulse train $f_x$, again. The counter 182 decreases its content which is transferred from the counter 181 in response to every one of the pulses of the pulse train $f_2$. When the content reduces down to a predetermined value, the counter 182 produces an output signal, which is applied to an output circuit 20. It is of course understood that the predetermined value can be selected at zero. In view of the operation of both counters, hereinafter, the counter 181 will be called an up-counter and the counter 182 a down-counter.

The output circuit 20 includes, for example, an univibrator, which converts the output pulse of the counter 182 into a signal with the desired pulse width. The converted signal is given to a base electrode of a power transistor (not shown) which switches the current flowing through a primary winding of a known ignition coil (not shown), whereby a voltage high enough to produce a spark between the electrodes of the spark plugs is induced across a secondary winding of the ignition coil. The induced high voltage is distributed to the respective spark plugs through the distributor in a well-known manner.

Figure 4:
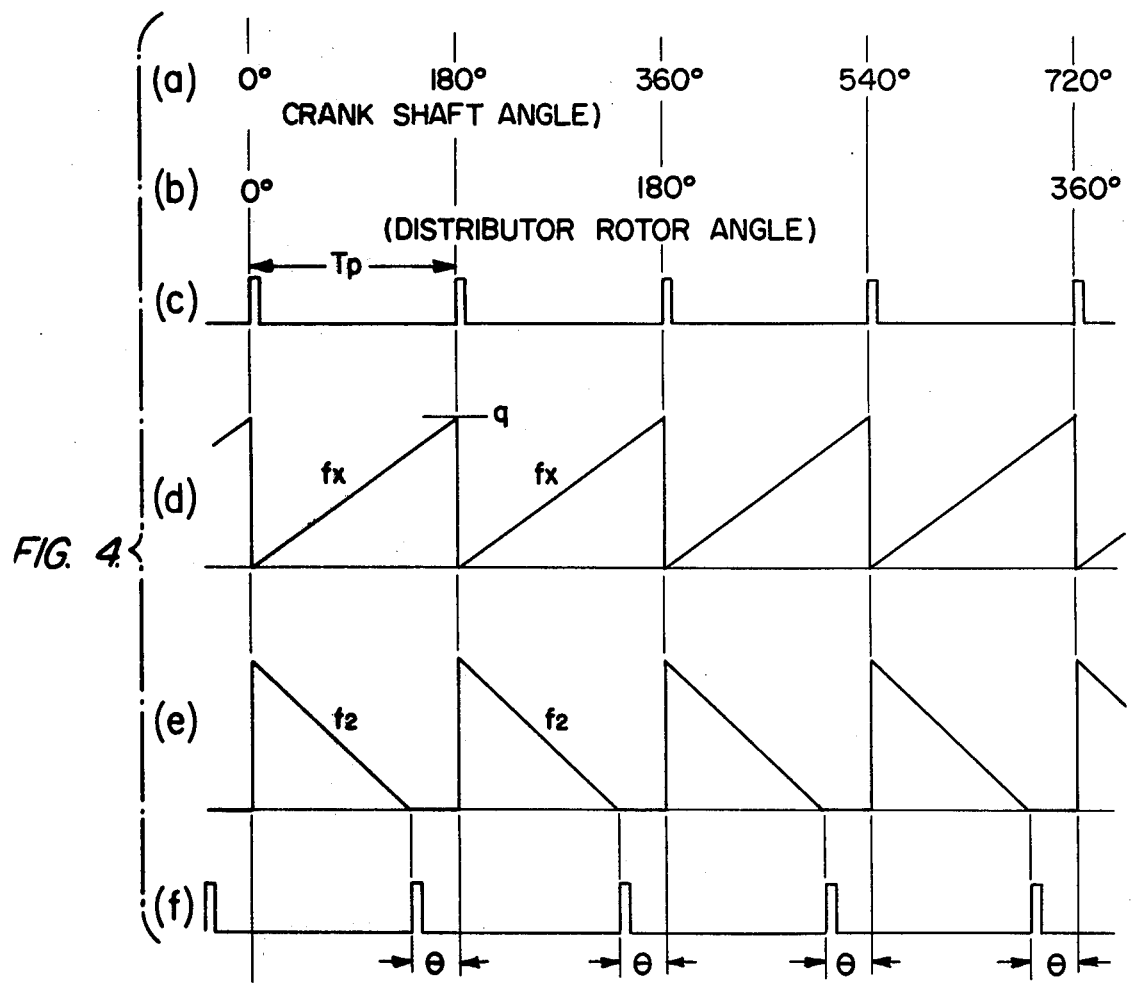
FIGS. 4(a) to 4(f) are charts showing, with respect to the angular positions of the crankshaft and the distributor rotor, the operation of an ignition timing control unit as used in the device of FIG. 1.

Referring now to FIGS. 2 to 4, an explanation will be made of the operation of the ignition timing control device described above.

The frequency divider 166 produces the pulses as shown in FIG. 2(a), the repetition period of which is T ($=256/f_3$). By one of those pulses, the preset counter 164 is cleared (but its contents may be already zero) and the memory 163 outputs to the counter 164 the data which is stored in the address designated by the signals from the counter 161 and the A/D converter 162, so that the counter 164 is newly preset. Further, the pulse from the divider 166 resets the flip-flop circuit 165. The content newly preset begins to be subtracted by the pulse train $f_3$. When the content of the counter 164 becomes zero, the output signal is produced. The change of the content of the counter 164 and the output thereof are shown in FIGS. 2(b) and 2(c), respectively. In FIG. 2(b) the value p (the height of the saw tooth wave shown) corresponds to the data read out from the memory 163 and preset in the counter 164.

The flip-flop circuit 165 alters its state from a reset state to a set one in response to the output pulse of the counter 164. The flip-flop circuit 165 repeats the operation of a set-reset to produce the output at the Q and $\overline{Q}$ terminals thereof. The Q and $\overline{Q}$ outputs are shown in FIGS. 2(d) and 2(e) respectively. The duration of the set state is indicated by $t_1$ and that of the reset state by $t_2$. As is apparent from the figures, the sum of $t_1$ and $t_2$ is equal to the repetition period T of the pulses from the divider 166. Further, the negative gradient of the saw-tooth wave shown in FIG. 2(b) is constant, because it is determined by the frequency of the pulse train from the counter 142, i.e., $f_3$, which is constant. The duration of $t_1$ ($t_2$), therefore, can be controlled by changing the value p which is preset in the counter 164. Namely, it will be understood that the flip-flop circuit 165 serves as a time sharing means which divides a time period repeated with a given constant frequency established by the divider 166 into two time portions at the rate according to the value p.

The Q output (set output) of the flip-flop circuit 165 opens the AND gate 167 for the duration of $t_1$. During the period $t_1$, the pulses from the divider 169 pass through the AND gate 167 to reach the OR gate 170. The $\overline{Q}$ output (reset output) of the circuit 165 opens the AND gate 168 for the duration $t_2$. During the period $t_2$, the pulses from the counter 142 pass through the AND gate 168 to reach the OR gate 170. The output pulse train $f_x$ of the OR gate 170, therefore, becomes as shown in FIG. 3(a).

As is apparent from the above explanation and the figures, the pulse train $f_x$ includes two frequency components, i.e., $f_3$ and $f_3/4$. FIG. 3(b) shows a part of the time-expansion of the pulse train $f_x$. The mean frequency $f_x$ of this pulse train is represented by the following equation.

$$f_x = (f_3 \times \tfrac{1}{4} \times t_1 + f_3 \times t_2) \times (1/T) = (t_1 \times \tfrac{1}{4} + t_2) \times f_3 \times (1/T)$$

The above equation indicates that the frequency $f_x$ can be controlled by adjusting $t_1$ or $t_2$.

As shown in FIG. 3(a) or 3(b), there is an irregularity in the interval of the pulses of $f_x$. The period of the pulses during the time-portion $t_1$ is longer than that during the time-portion $t_2$; the former is four times as long as the later, in this case, because of use of the one-fourth frequency divider 169. If, however, the repetition period T is selected so short that the irregularity is repeated very frequently, no problems are caused thereby.

The output pulse train $f_x$ of the OR gate 170 is applied to the up-counter 181 of the ignition unit 18. The operation of the unit 18 will be explained hereinafter with reference to FIGS. 4(a) to 4(f).

In these figures, FIGS. 4(a) and 4(b) are the drawings for the purpose of showing the relationship of the various pulses and operating waveforms with respect to the angular positions of the crankshaft and the distributor rotor.

The position signal generator 10 produces the output pulses as shown in FIG. 4(c) in accordance with the rotation of the engine. The repetition period Tp thereof is in inverse proportion to the rotational speed of the engine. Upon receipt of the pulse from the generator 10, the counter 181 transfers its content to the counter 182 thereby to be cleared and begins to count the pulses of $f_x$ again, as shown in FIG. 4(d). The counter 181 repeats the operation above-mentioned for every pulse from the position signal generator 10. The value q (the height of the saw tooth wave of FIG. 4(d)) represents the counter value of the counter 181 for the duration of Tp. It will be easily understood that the value q changes in accordance with the frequency $f_x$ if the duration Tp is constant. In fact, since the repetition period Tp is very large compared with that of the pulse train $f_x$ and does not change in the wide range abruptly, it can be considered almost constant under the usual operation of the engine. Even if the number of revolutions of the engine is changed, the change cannot be abrupt, so that the period Tp does not change so suddenly that, for example, the period Tp of a certain cycle becomes under half as long as that of the just preceding cycle. It can be seen, therefore, that the value q is almost in proportion to the frequency $f_x$. In other words, the changing of the frequency $f_x$ means the change of the positive gradient of the saw tooth wave shown in FIG. 4(d).

Now, when the counted value q of the up-counter 181 is transferred to the down-counter 182, it begins to be reduced by the number of pulses of $f_2$ applied thereto. The variation of the content of the down-counter 182 is as shown in FIG. 4(e). The negative gradient of the counting-down shown in FIG. 4(e) is determined by the frequency $f_2$. It is, therefore, constant, because the frequency $f_2$ is constant. When the content of the down-counter 182 reaches a predetermined value as a result of the above mentioned subtraction, the down-counter 182 produces an output signal as shown in FIG. 4(f). The predetermined value above mentioned is set at zero. This value, however, can be selected arbitrarily, if necessary. The angle $\theta$ shown in FIG. 4(f) represents the advance angle in the ignition timing. The angle $\theta$ can be represented by the following equation, with respect to the angle of the crankshaft.

$$\theta = 180° \times (1 - (f_x/f_2))$$

As is apparent from the above equation, the angle $\theta$ can be adjusted by the frequency $f_x$ which is established by the unit 16.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An ignition timing control device for generating an ignition timing signal for an internal combustion engine, comprising position signal generator means for generating position pulses corresponding to predetermined angular positions of the crankshaft of the engine, first pulse generating means for generating a first pulse train, second pulse generating means for generating a second pulse train, at least one of said first and second pulse trains being composed of consecutive time portions each made up of at least first and second pulse groups of different frequency, means for selectively regulating the relative time durations of said first and second pulse groups in each time portion of said at least one pulse train in accordance with an operating condition required of the engine, first counting means for counting said first pulse train from said first pulse generating means and being reset upon receipt of each position pulse from said position signal generator means, second counting means which is preset to the count of said first counting means by each position pulse prior to reset of said first counting means for decrementing the count thereof in response to said second pulse train from said second pulse generating means, and output means for generating said ignition timing signal each time the count of said second counting means is reduced to a predetermined value.

2. An ignition timing control device as claimed in claim 1, wherein said first pulse generating means comprises first means for generating pulses at a first frequency, second means for generating pulses at a second frequency, and pulse train forming means for alternately enabling said first and second means repetitively to form said first pulse train of alternating first and second pulse groups having pulses at said first and second frequencies, respectively.

3. An ignition timing control device as claimed in claim 2, wherein said selectively regulating means comprises time sharing control means for selectively regulating the ratio of the time durations of said first and second pulse groups in accordance with an operating condition required of the engine.

4. An ignition timing control device as claimed in claim 3, wherein said time sharing control means comprises a presettable counter which is preset to a preselected value for each period between position pulses, third counting means for generating a third pulse train which is applied to said presettable counter to decrement the count thereof, and means responsive to said presettable counter for enabling said first means to generate pulses at said first frequency while said presettable counter has a count above a preset value and for enabling said second means to generate pulses at said second frequency after said counter reaches said preset value.

5. An ignition timing control device as claimed in claim 4 wherein said selectively regulating means comprises control means for presetting said presettable counter to a preselected value which is determined in accordance with an operating condition of the engine.

6. An ignition timing control device as claimed in claim 5, wherein said control means includes a memory in which is stored a plurality of preselected values related to ignition timing in accordance with various operating conditions required of the engine, and means responsive to an engine operating condition for reading a stored value from said memory into said presettable counter.

7. An ignition timing control device for generating an ignition timing signal for an internal combustion engine, comprising position signal generator means for generating a position signal related to the angular position of the crankshaft of the engine, first pulse generating means for generating a first pulse train divided into consecutive time portions each made up of at least first and second pulse groups of different frequency, means for selectively regulating the relative time durations of said first and second pulse groups in each time portion in accordance with an operating condition required of the engine, second pulse generating means for generating a second pulse train, first counting means for counting one of said first and second pulse trains for a period whose duration corresponds to a predetermined angular rotation of said crankshaft as determined from said position signal, second counting means for decrementing the maximum count of said first counting means in response to the other of said first and second pulse trains, and output means for generating said ignition timing signal each time the count of said second counting means is reduced to a predetermined value.

8. An ignition timing control device as claimed in claim 7, wherein said first pulse generating means comprises first means for generating pulses at a first frequency, second means for generating pulses at a second frequency, and pulse train forming means for alternately enabling said first and second means repetitively to form said first pulse train of alternating first and second pulse groups having pulses at said first and second frequencies, respectively.

9. An ignition timing control device as claimed in claim 7, wherein said selectively regulating means comprises time sharing control means for selectively regulating the ratio of the time durations of said first and second pulse groups in accordance with an operating condition required of the engine.

* * * * *